Patented Jan. 20, 1931

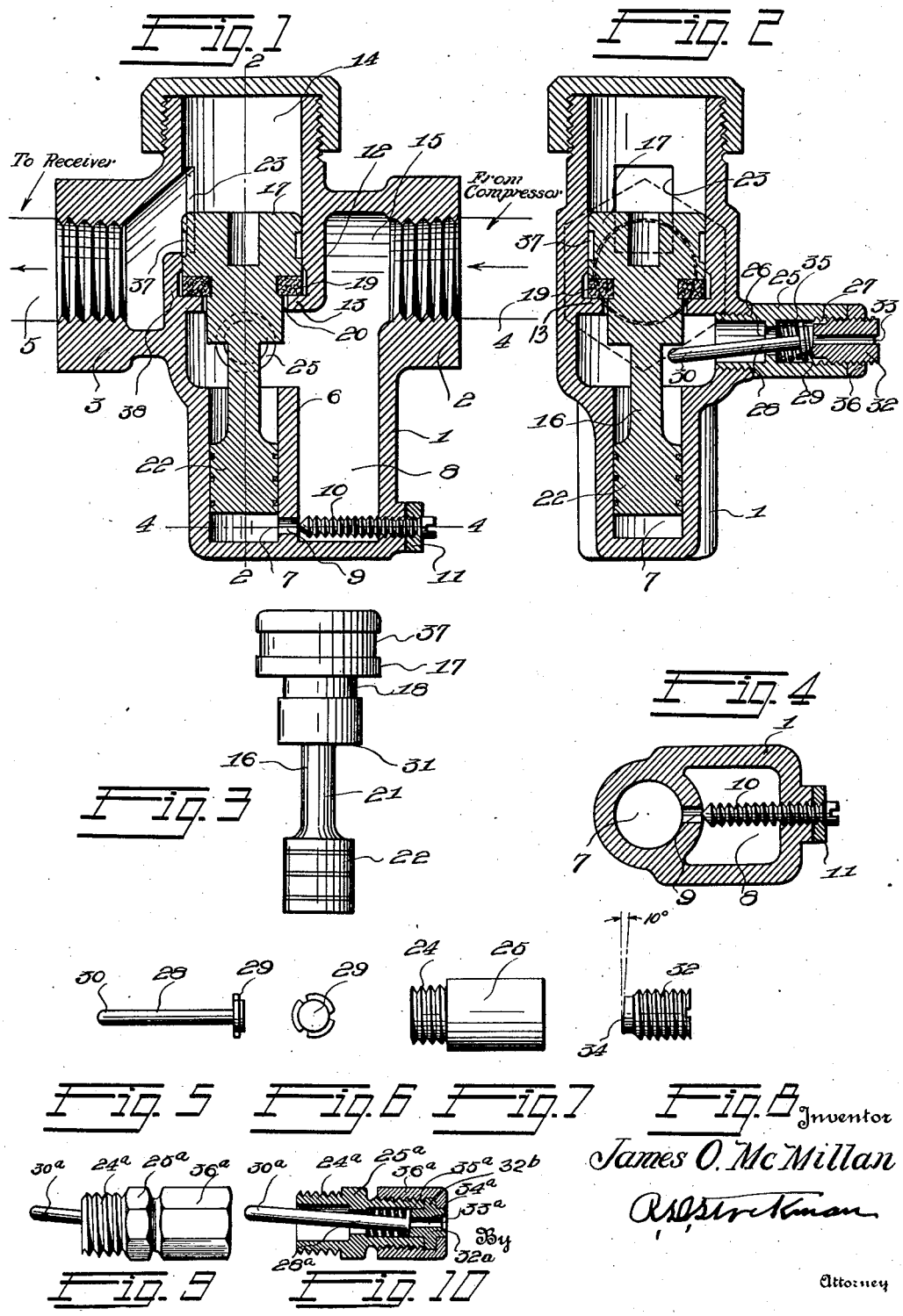

1,789,388

UNITED STATES PATENT OFFICE

JAMES O. McMILLAN, OF ELDORADO, KANSAS, ASSIGNOR TO AIR-O-MATIC MANUFACTURING COMPANY, OF WICHITA, KANSAS, A CORPORATION OF TEXAS

COMBINED CHECK VALVE AND UNLOADER

Application filed November 27, 1926. Serial No. 151,142.

This invention relates to improvements in air or other gas compressors, and particularly to a combined check valve and bleed valve adapted to be arranged in a pipe line between a compressor and receiver, for unloading the compressor when the latter stops running or operates below a predetermined minimum speed.

The invention therefore relates primarily to starting unloaders for air or other gas compressors, and includes a non-pulsating leak proof check valve, operating in the discharge pipe of the compressor, the main purpose of this combination being to automatically unload a portion of the discharge pipe adjacent to the compressor, whenever the compressor stops its compressive action or reduces the same to a predetermined minimum, thereby facilitating the starting of the compressor against pressure in the mains or tanks which the compressor is supplying, and which are located beyond my improved unloading device.

The unloader is particularly applicable to a compressor in which the starting and stopping of the motor or engine, driving the compressor, is controlled by electrical or other suitable and usual means. The function of the unloader is primarily to provide for unloading during the starting period, and the check valve prevents leakage from the receiver after the compressor has ceased its compressive action.

Another object of the invention is to provide an unloader having adjustable means to enable the device to be adapted to compressors of various sizes, such means being so constructed as to prevent clogging or sticking of the movable parts.

A still further object is to furnish a check valve which will be silent in operation, non-pulsating, leak proof and capable of long wear.

Another object is to provide an unloader of simple, inexpensive and durable contruction, requiring no close adjustments or particularly fine workmanship.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a vertical longitudinal sectional view of my improved unloader.

Fig. 2 is a transverse sectional view taken on line 2—2 of Fig. 1.

Fig. 3 is an elevation of the check valve and piston forming part of my construction.

Fig. 4 is a horizontal transverse sectional view taken on line 4—4 of Fig. 1.

Fig. 5 is an elevation of a bleed valve forming part of my construction.

Fig. 6 is an end view of the same.

Fig. 7 is an elevation of the bleed valve casing.

Fig. 8 is a similar view of the adjustable seat which cooperates with the bleed valve.

Fig. 9 is an elevation of a modified form of bleed valve.

Fig. 10 is a longitudinal sectional view of the same.

In the drawing, 1 designates the casing of my unloader which may be made up of a casting, and provided with an inlet connection 2, and an outlet connection 3. The inlet is threaded for connection with a pipe 4 leading from the compressor, and the outlet is threaded for connection to a pipe 5 leading to the storage tank, receiver or the like.

The lower portion of the interior of the casing is provided with a partition 6 dividing the lower part of the casing into a dash-pot chamber 7 and an oil storage chamber 8, which communicate at their lower ends through a port 9 controlled by a threaded pin 10, which may be adjusted from the exterior of the casing, and retained in position by means of a nut 11.

The upper portion of the interior of the housing is divided by a partition 12 having an annular valve seat 13 at its lower end. The partition 12 divides the upper portion of the casing into a check valve chamber 14 and an intake chamber 15. The chambers 14 and 6 are of cylindrical formation to accommodate the combined check valve and dash-pot piston 16, shown detached in Fig. 3. The upper end of the member 16 is enlarged to provide a check valve head 17 having a groove 18 to receive a packing washer 19, which fits on the seat 13 and effectively seals the passageway 20 when the valve is closed. A stem 21 depends from the head 17 and terminates in a piston 22 which works in the dash-pot chamber 7.

A port 23 places the valve chamber 14 in communication with the air outlet pipe 5.

The valve casing is provided at one side with a threaded opening to receive the threaded end 24 of a bleed valve casing 25, the latter being provided with an internal annular shoulder 26 and internal threads 27. A bleed valve 28 is arranged in the casing 25, and includes a notched head 29, and a stem 30, the latter projecting through the annular flange 26 and terminating beneath a shoulder 31 on the member 16. A threaded valve seat 32 is adjustably fitted in the outer end of the casing 25, and has a passageway 33 therethrough. The inner end of this valve seat has an inclined face 34 against which the head 29 may bear for closing the conduit 33. A coil spring 35 is arranged in the casing 25, and tends to force the head 29 against the face 34.

From Fig. 8, it may be seen that the face 34 of the bleed valve seat has an angle of 10 degrees, whereby, when the seat is turned, the end of the stem 30 describes a circle, thus securing the effect of raising and lowering. The valve seat 32 may be readily adjusted by turning the same with a screw-driver or the like, and when it is in proper position, it can be fixed in place by a lock nut 36.

In operation, air or other gas from the compressor, enters the valve body 1 from the compressor discharge line 4, and any entrained oil or moisture will strike the partition 12 and be deflected downwardly into the oil chamber 8. As the compressor gains speed, the air or other gas escapes through the conduit 33, as the parts will be in the position shown in Figs. 1 and 2, at this time. However, the compressor will force the air faster than it can escape, with the result that the pressure will gradually rise in the chambers 15 and 8, until a pressure equal to that on the top of the valve 17 has been attained. Then, as the pressure increases in the chambers 15 and 8, the check valve 17 rises and the spring 35 causes the bleed valve 28 to immediately close. As soon as the bleed valve closes, the member 16 will have risen sufficiently to permit the compressed air to pass through openings 20 and 23, into the pipe 5 leading to the receiver or the like. As the member 16 rises, oil from the chamber 8 will rush through the port 9 into the dash-pot chamber 7, but during descending movements of the member 16, the oil from the dash-pot chamber will not discharge through port 9 at a very rapid rate, owing to the small gauge of port 9, thus eliminating pulsation and preventing pounding out of the valve seat.

After the valve 17 has been opened, it will remain in that condition until the pressure entering at 2 falls below that in the discharge connection 3. This condition is brought about by either stopping the compressor or permitting it to operate below a predetermined minimum speed. Gravity initiates the descent of member 16, as pressure originally is equal on all surfaces of valve 17 until bottom of valve 17 enters valve cup 38, when communication between valve chamber 14 and 15 is gradually cut off, and back pressure augments descent of valve 17 and ultimately effects positive seating simultaneously, with opening of bleed valve 28. Descent of valve 17 is facilitated by pressure equalizing groove 37. Immediately the valve 17 has descended sufficiently far to close off communication between the chambers 14 and 15, the shoulder 31 strikes the stem 30, and then as the valve continues to descend, the bleed valve 28 will be opened and the bleed port 33 will function to unload the compressor.

The oil dash-pot forms an important feature of the present invention, as the oil holds the check valve 17 up, while the compressor is in operation, thus preventing wear, pounding etc. The oil also acts as a lubricant, and eliminates gumming up of the structure, as it keeps it washed clean. The valve structure is kept well filled by oil and moisture, as the oil extracted from the air passes through the valve structure.

In Figs. 9 and 10, I have illustrated a modification of the bleed valve. In this embodiment, the casing is provided with external screw threads 24a for use in attaching the same to the valve casing 1. The bleed valve casing also has an angular part 25a to be engaged by the tool employed for turning such casing. The bleed valve proper, 28a, has a stem 30a, and its head seats against the inclined face of a rotatable valve seat 32a which is provided with an external flange 32b. This flange engages the outer end of the casing and is held in place by a cap 36a. A spring 35a forces the valve against the seat 32a, and this seat has a port 34a and a slot 33a, the latter to receive a screw-driver.

This bleed valve is operated in the same manner as the one shown in Fig. 2, and the valve seat is adjusted by turning the same with a screw-driver or the like.

From the foregoing, it is believed that the construction, operation and advantages of the invention may be readily understood, and I am aware that changes may be made in the details disclosed without departing from the spirit of the invention as expressed in the claims.

What I claim and desire to secure by Letters Patent is:

1. In a device of the character described, a casing having an inlet and an outlet, a port in the casing placing the inlet and outlet in communication, a check valve controlling said port and opening under pressure exerted in the inlet, a bleed valve structure having a passageway communicating with the inlet, and a bleed valve for controlling said passageway, said bleed valve being controlled by the check valve, said bleed valve structure including a valve seat against which the bleed valve impinges, said valve seat being rotatably mounted and having a face to engage the bleed valve, said face being inclined in a plane at an angle to the axis of rotation.

2. In a device of the character described, a casing having an inlet and an outlet, a port in the casing placing the inlet and outlet in communication, a check valve controlling said port, and a bleed valve structure having a passageway communicating with the inlet, and a bleed valve for controlling said passageway, said bleed valve being controlled by the check valve, said bleed valve structure including a housing, a spring in the housing engaging said bleed valve, and a valve seat, the valve being forced toward the seat by said spring, said valve seat being rotatably mounted and having a face to engage the bleed valve, said face being inclined in a plane at an angle to the axis of rotation.

3. In a device of the character described, a check valve casing, a bleed valve casing connected thereto, a hollow valve seat adjustably mounted in the bleed valve casing, and having a plane inclined face arranged at an angle to the axis of the seat, a bleed valve including a head and stem, means for forcing the head into contact with the inclined face, said valve stem extending into the check valve casing, and a pressure actuated check valve in the check valve casing adapted to engage the stem for opening the bleed valve.

4. In a device of the character described, a casing having an inlet and an outlet, a port placing the inlet and outlet in communication, a partition in the casing dividing a portion of the interior of the same into a dash pot chamber and a liquid storage chamber arranged side by side, a check valve controlling said port, a piston connected to the check valve and operating in the dash pot chamber, a port in said partition placing said chambers in communication, a bleed port communicating with the inlet, and a bleed valve for the bleed port controlled by said check valve.

5. In a device as claimed in claim 4, a second partition arranged in the casing and functioning to direct liquid entering the intake into said liquid chamber.

6. In a device of the character described, a casing having an inlet and an outlet, a port placing the inlet and outlet in communication and having a lower endless surface and a larger upper endless surface, a partition in the casing dividing a portion of the interior of the same into a dash pot chamber and a liquid storage chamber arranged side by side, a check valve controlling said port and having a smaller portion reciprocating past the smaller endless surface of the port, said check valve also having a larger portion slidably engaging the larger endless surface of the port, said port having an annular shoulder between its larger and smaller endless surfaces, a packing washer surrounding the check valve and engaged with said shoulder for sealing the port, a piston united with the check valve and operating in the dash pot chamber, a port in said partition placing said chambers in communication, a bleed port communicating with the inlet, and a bleed valve for the bleed port controlled by said check valve.

7. In a device of the character described, a casing having an intake and an outlet, the intake being adapted to be connected to a gas compressor and the outlet being adapted to be connected to a compressed gas receiver, a port in the casing placing the intake and outlet in communication, a check valve controlling said port and operating due to differences in pressure in the intake and outlet, a dash pot chamber, an imperforate piston connected to the check valve and operating in said chamber, an oil chamber arranged at one side of the dash pot chamber, a passageway placing the oil chamber in communication with the dash pot chamber to permit oil to be fed from one chamber to the other when the valve opens or closes, a bleed valve structure having a passageway communicating with the inlet above said dash pot chamber and also communicating with the latter, and a bleed valve for controlling the last mentioned passageway, said bleed valve being controlled by the check valve.

8. A device as claimed in claim 7, including means for controlling the flow of oil through the passageway between the oil chamber and the dash pot chamber.

JAMES O. McMILLAN.